United States Patent [19]
Cloutier et al.

[11] Patent Number: 6,075,464
[45] Date of Patent: Jun. 13, 2000

[54] DYNAMIC AND NON-CONTACT MEASUREMENT OF DISPLACEMENT OR OF PERMITTIVITY BY USE OF A CAPACITIVE SENSOR

[75] Inventors: Marius Cloutier, Boucherville; Sylvain Savard, Ste Julie; Jean Marc Bourgeois, Longueuil; François Lalonde, Varennes, all of Canada

[73] Assignee: Hydro Quebec, Montreal, Canada

[21] Appl. No.: 07/732,493

[22] Filed: Jul. 18, 1991

[51] Int. Cl.[7] .................................................. G08C 19/10
[52] U.S. Cl. ...................... 340/870.37; 324/661; 324/690
[58] Field of Search ............................... 340/870.37, 618; 324/661, 662, 670, 688, 690, 686

[56] References Cited

U.S. PATENT DOCUMENTS

| | | | |
|---|---|---|---|
| 2,962,641 | 11/1960 | Maltby et al. | 318/29 |
| 4,675,670 | 6/1987 | Lalonde et al. | 324/688 |
| 4,893,071 | 1/1990 | Miller | 324/686 |
| 4,959,615 | 9/1990 | Andermo | 324/690 |
| 4,963,829 | 10/1990 | Wereb | 324/660 |
| 5,051,921 | 9/1991 | Paglione | 340/618 |

FOREIGN PATENT DOCUMENTS 2 181 246   4/1987   United Kingdom .

*Primary Examiner*—Michael Horabik
*Assistant Examiner*—Timothy Edwards
*Attorney, Agent, or Firm*—Foley & Lardner

[57] ABSTRACT

A method for dynamic and non-contact measurement of the displacement of a conductive substance with respect to a capacitive sensor formed by two parallel conductive plates, superimposed, electrically insulated from one another, and fed by a high frequency signal having a predetermined voltage, the capacitive sensor being connected to a device for detecting a current value. Also disclosed is a method for dynamic and non-contact measurement of the permittivity of a dielectric substance between a conductive part and a capacitive sensor of the above-mentioned type.

7 Claims, 7 Drawing Sheets

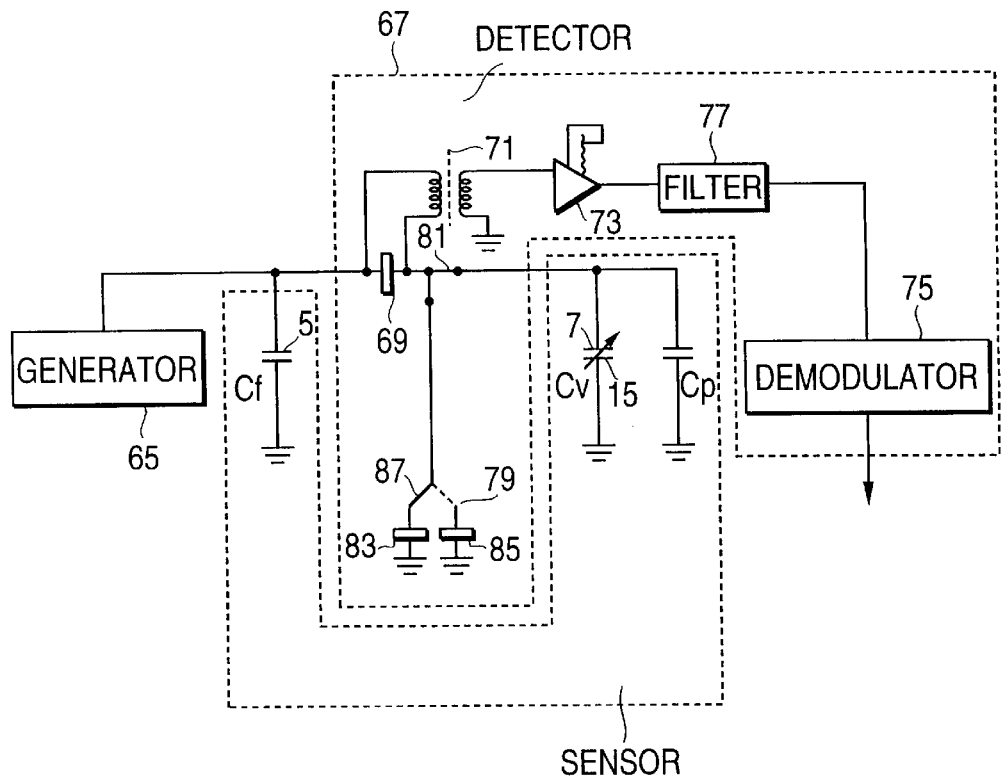

DYNAMIC AND NON-CONTACT MEASUREMENT OF DISPLACEMENT OR OF PERMITTIVITY BY USE OF A CAPACITIVE SENSOR

BACKGROUND OF THE INVENTION

1. Field of the Invention

The present invention relates to a method for dynamic and non-contact measurement of a displacement of a grounded conductive substance with respect to a capacitive sensor and to a method for dynamic and non-contact measurement of the permittivity of a dielectric substance between a grounded conductive part and a capacitive sensor. The invention relates more particularly to a method for dynamic and non-contact measurement of a displacement which can be used favourably to permanently measure with relative simplicity the axial displacement of a shaft of a rotating machine or to measure a fluid level in a tank, and also to a method for dynamic and non-contact measurement of the permittivity of a dielectric substance which can be used favourably to also measure a fluid level in a tank or continuously monitor with relative simplicity a possible change in the composition of a substance flowing through a conduit.

2. Description of the Prior Art

U.S. Pat. No. 4,675,670 granted to HYDRO-QUEBEC describes an apparatus and a method for dynamic and non-contact measurement of the distance separating the surface of a first part, that may be conductive or not, from the surface of a second conductive part closely spaced from the first part and grounded, such as the stator and rotor of an electric generator. The apparatus and method can be permanently used without significant modification or excessive congestion, while providing precise and reliable results even in the presence of intense magnetic fields or temperature variations.

The above-mentioned apparatus includes a sensor made of two parallel conductive plates, superimposed and electrically insulated from one another, and fed by a high frequency signal between 100 kHz and 10 MHz at a predetermined voltage between 5 and 100 volts, connected to a device for detecting a current value, which is itself connected to a device which processes the detected current value, such as a computer.

The sensor during its use forms a capacitor with the grounded conductive part, so that the capacitance is determined by the following known equation:

$$C = \frac{KAr}{D} \quad (1)$$

in which:

$K = \epsilon_0 \epsilon_r$, $\epsilon_0$ being the vacuum permittivity (8.854 pF/m) and $\epsilon_r$ being the relative permittivity of the dielectric substance between the nearest sensor plate from the conductive part and this conductive part;

Ar is the overlapping surface of the conductive part on the sensor plate; and

D is the distance between the surface of the nearest sensor plate from the conductive part and this conductive part.

When the so formed capacitor is subjected to a high frequency signal, a measureable current is induced in the sensor plates, of which the intensity responds in accordance with the following equation:

$$i = \omega Cv \quad (2)$$

in which:

$\omega = 2\pi f$, f being the frequency of the emitted signal;

V is the voltage difference between the nearest sensor plate from the conductive part and this conductive part; and C is the above-mentioned capacitance.

Equation (1) shows that for constant dielectric value K and overlapping surface Ar, the capacitance C, and so the current i of equation (2), varies according to the inverse of the distance D separating the sensor from the conductive part, making possible the mentioned method for dynamic and non-contact measurement of the distance between the nearest capacitive sensor plate from a conductive part and the conductive part.

As it can be easily seen, the apparatus can be similarly used to carry out the measurement of another variable parameter in equation (1), such as the permittivity K or the overlapping surface Ar for instance, as long as the other parameters are fixed.

SUMMARY OF THE INVENTION

A first object of the present invention is therefore to propose a new method using the above-mentioned apparatus for dynamic and non-contact measurement of the displacement of a grounded conductive substance with respect to a capacitive sensor, this first method comprising the steps of:

(a) positioning the capacitive sensor at a fixed distance close to the conductive substance, the plates of the capacitive sensor being parallel to the plane in which the conductive substance extends, such that a displacement of this substance in the mentioned plane modifies an overlapping surface formed by portions of the conductive substance and the capacitive sensor which are superimposed;

(b) detecting the current induced by a high frequency signal in the capacitive sensor, this current having a value varying in a directly proportional relationship with the overlapping surface; and (c) determining the value of the displacement of the conductive substance in respect with the capacitive sensor according to the value of the current.

This method is not restricted to turbine machines or to tanks since it allows a displacement measurement of any conductive substance with respect to the sensor, as long as the overlapping surface of the conductive substance on the sensor varies at the time of the displacement.

A second object of the present invention is to propose a new method also using the above-mentioned apparatus for performing a dynamic and non-contact measurement of the permittivity of a dielectric substance between a grounded conductive part and a capacitive sensor, this second method comprising the steps of:

(a) positioning the capacitive sensor at a fixed distance close to the conductive part so that the dielectric substance whose permittivity is to be measured is between the conductive part and the capacitive sensor;

(b) detecting the current induced by a high frequency signal into the capacitive sensor, this detected current varying in a directly proportional relationship with the permittivity of the dielectric substance; and (c) determining the value of the permittivity of the dielectric substance between the conductive part and the capacitive sensor according to the value of the current.

Once again, this method is not restricted to tanks or to the detection of a change in the composition of a substance flowing in a conduit since it allows the permittivity of a dielectric substance between a capacitive sensor and any conductive part to be measured.

BRIEF DESCRIPTION OF THE DRAWINGS

The invention as well as its numerous advantages will be better understood by the following non-restrictive description of possible embodiments made in reference to the appended drawings in which:

FIG. 4b is a detailed side view of the coupling joint shown in FIG. 4a;

FIG. 4c is a detailed top view of the coupling joint shown in FIG. 4a;

FIG. 8 shows a diagram of the measurement, detection and calibration circuit used within the framework of the present invention; and FIG. 9 is a block diagram showing the principal functions of the apparatus used by the methods according to the invention.

DESCRIPTION OF THE PREFERRED EMBODIMENTS

Figure 1:
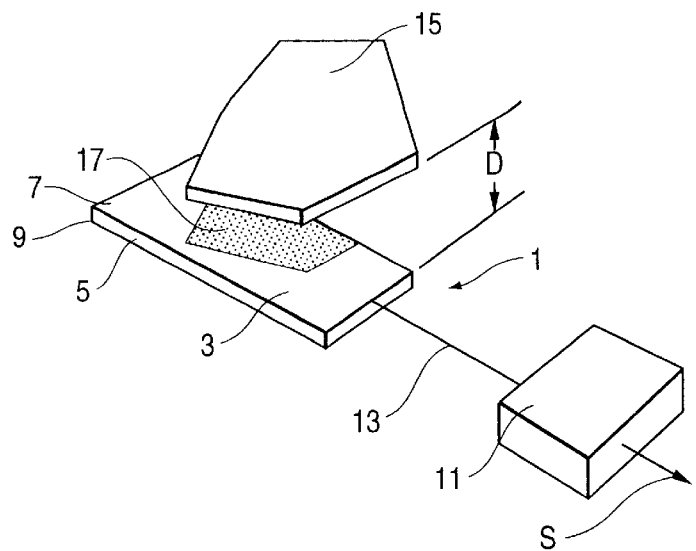
FIG. 1 shows a principle schematic of the methods according to the invention.

Referring now to FIG. 1 of the accompanying drawings, the apparatus 1 used to implement the methods according to the invention comprises at least one capacitive sensor 3 made of two plates 5 and 7 which are conductive, superimposed and electrically insulated from one another by an appropriate insulator 9, a supply and detection device 11 to supply the two plates 5 and 7 of each sensor with the same high frequency signal at same voltage and to detect the value of the induced current in the plate 7 by the high frequency signal, and a cable 13 connecting the plates 5 and 7 of each sensor to device 11. This device 11 generates an electric signal S, in relation to the detected current, which may be sent to a data processing apparatus such as a computer for example, to carry out the measurement according to the methods of the invention.

The high frequency signal feeding the plates 5 and 7 of the sensor is preferentially set at a frequency between 100 kHz and 10 MHz with a voltage between 5 and 100 volts peak-to-peak, in order to avoid possible parasitic noise, return impedance or insulation problems. The effect of parasitic noise can also be decreased by selecting the optimal dimension of the plates 5 and 7 and their separation distance.

The processing apparatus takes into consideration the non-linearity due to the construction and physical parameters of the capacitive sensor 3, so is calibrated beforehand to perform a precise conversion of the measured current in relation to the parameter making the object of the measurement using the methods according to the invention.

In the first method according to the invention (the method for dynamic and non-contact measurement of a displacement), the capacitive sensor 3 is positioned by appropriate means at a fixed distance D close to the conductive substance 15 such that its plates 5 and 7 are parallel to the plane in which the conductive substance 15 extends. In this plane, the common surface of the conductive substance 15 and the capacitive sensor 3 constitutes an overlapping surface 17. It is essential according to the present method that the area of the overlapping surface 17 varies at the time of a displacement of the conductive substance 15 with respect to the capacitive sensor 3 since the measured current is directly proportional to this area and that this measured current makes precisely the object of the measurement of the displacement.

Figure 2:
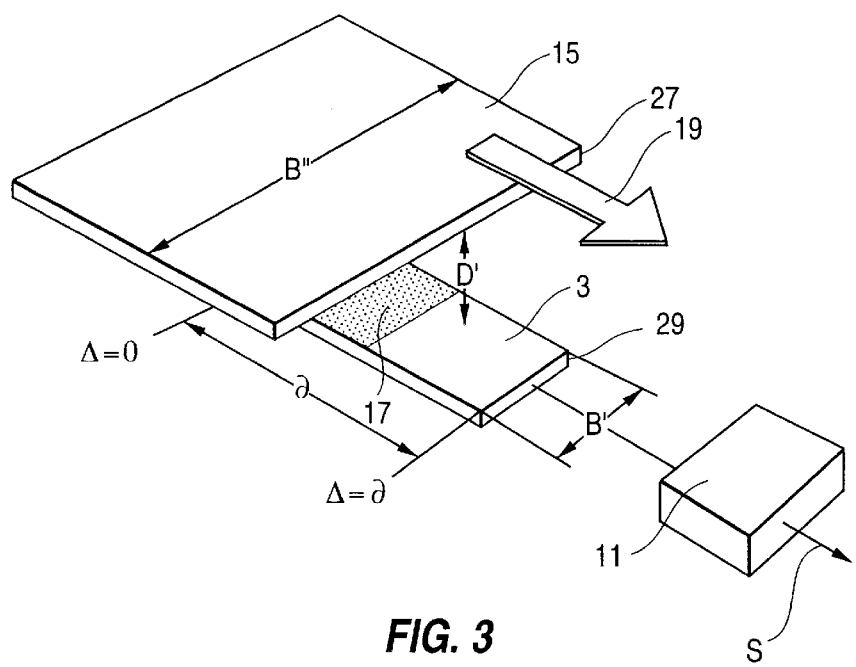
FIG. 2 is a schematic diagram showing the first method according to the invention for the displacement measurement of a conductive substance larger than the capacitive sensor.

FIG. 2 shows a use of the first method according to the invention (the method for measurement of a displacement) where the conductive substance 15 is larger than the capacitive sensor 3, the sensor 3 being of rectangular shape. Although this shape is not essential, it provides in the present use some characteristics of particular interest, which are graphically represented in FIG. 3.

Figure 3:
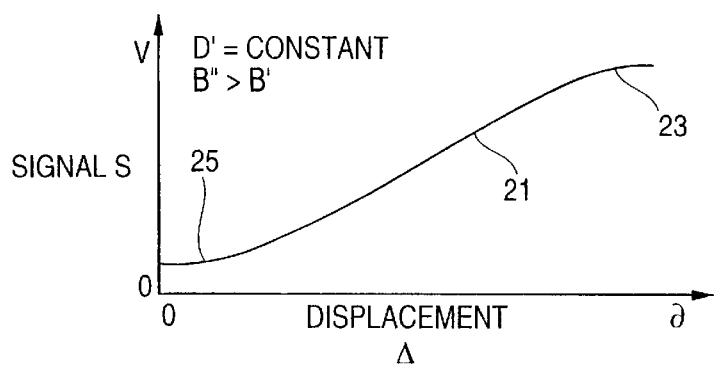
FIG. 3 shows a characteristic curve of the measured current value for an embodiment of the invention according to FIG. 2.

FIG. 3 shows the linearity resulting from the embodiment shown in FIG. 2, between the displacement in the direction of arrow 19 of the conductive substance 15 with respect to the capacitive sensor 3 and the electric signal S generated by the device 11. This characteristic is based on the fact that the overlapping surface 17 linearly increases in relation to the mentioned displacement. The curve 21 is mainly linear, although subjected to deflection 23 and 25 at each extremity when the edge 27 of the conductive substance 15 crosses the edge 29 of the capacitive sensor 3.

Figure 4A:
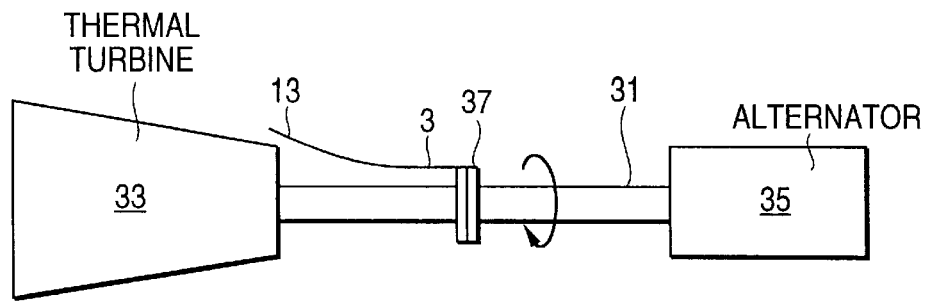
FIG. 4a shows the first method according to the invention for the displacement measurement of a coupling joint between a thermal turbine and an alternator.
Figure 4B:
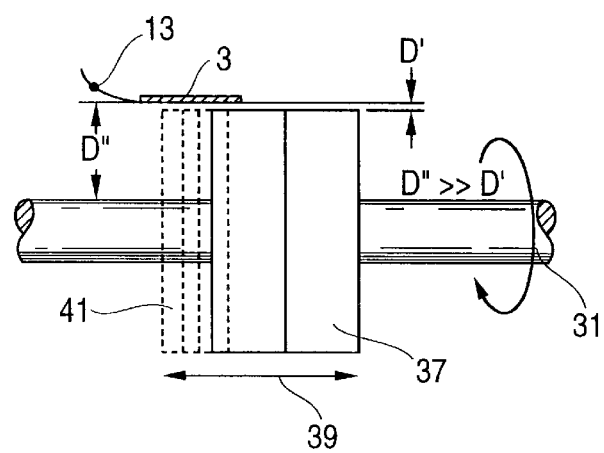
Figure 4C:
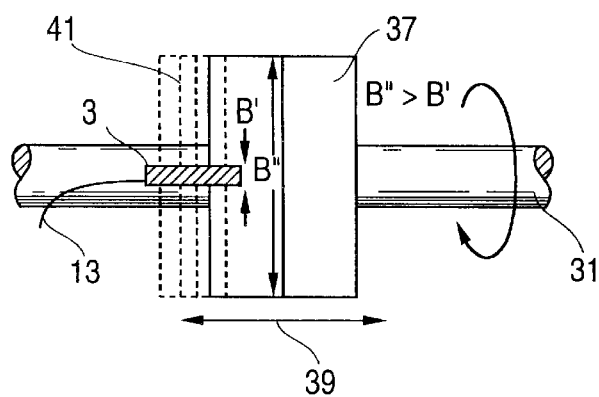

As shown in FIG. 4a, the first method according to the invention (for measurement of a displacement) may be used to measure the elongation of a turning shaft 31 linking a thermal turbine 33 to an alternator 35. The coupling joint 37 acts as conductive substance and therefore has to be grounded beforehand. As shown in the enlargements 4b and 4c, the sensor 3 is positioned parallel to and at a fixed distance D' from the coupling joint 37, such as to measure a possible displacement of the joint 37 in the direction of arrow 39, represented by the dotted lines 41. It is necessary that the distance D" between the capacitive sensor 3 and the shaft 31 shall be long enough with respect to the distance D' so that the shaft 31 has a negligible capacitive effect beside the sensor 3 and does not affect the measurement of the displacement. Since the width B' of the capacitive sensor 3 is smaller than the width B" of the coupling joint 37 and as a result of the fact that this sensor has a rectangular form, the relation between the displacement and the signal S is linear, reducing in this way the complexity of subsequent processings of the signal S.

Figure 5:
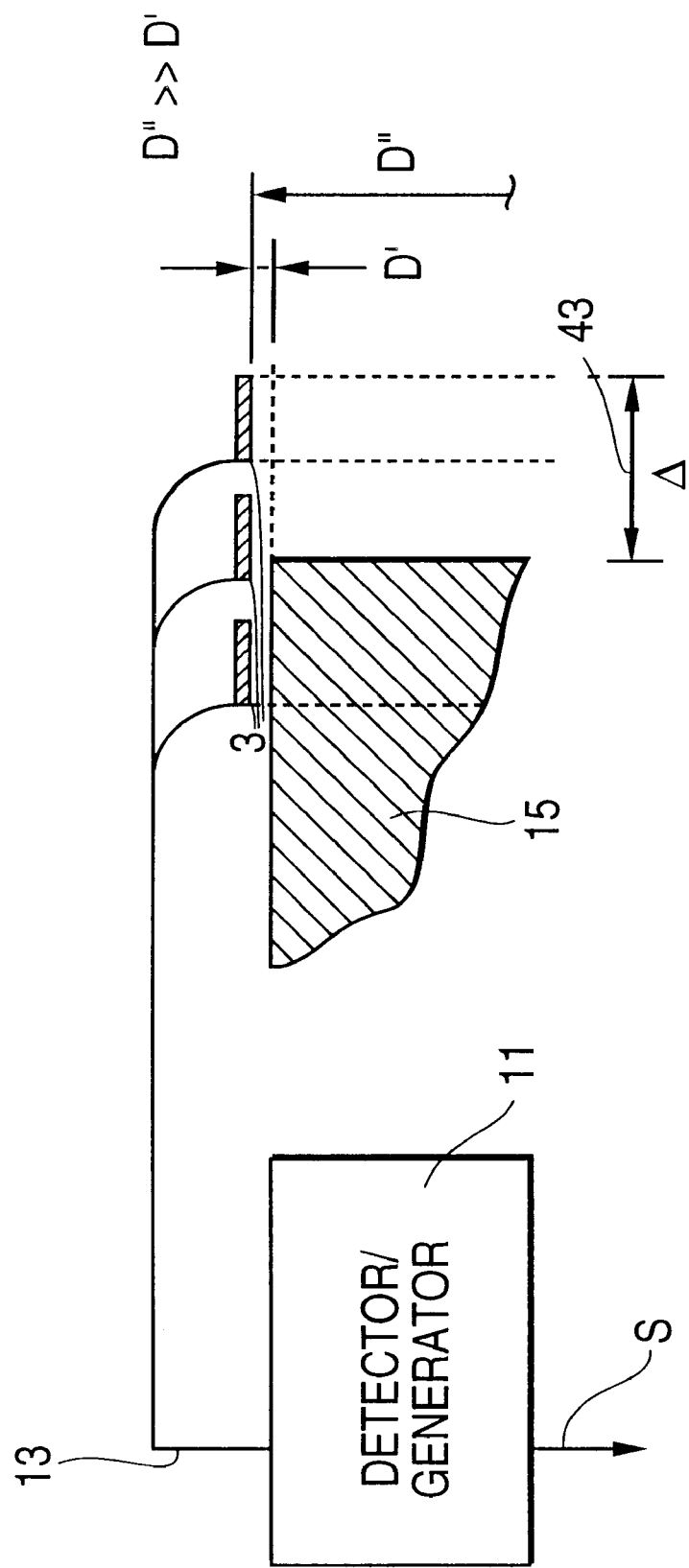
FIG. 5 shows the first method according to the invention for displacement measurement using several sensors.

Referring now to FIG. 5, when the displacement of the conductive substance 15 in the direction of arrow 43 is too large to be measured only by one sensor, it is possible to use several capacitive sensors 3 positioned according to the first method of the invention for measurement of a displacement, such as the displacement of the conductive substance 15 alters the overlapping surface of at least one sensor, changing so the value of the measured current. An easy way to obtain this result is to linearly position the sensors one after another.

Figure 6B:
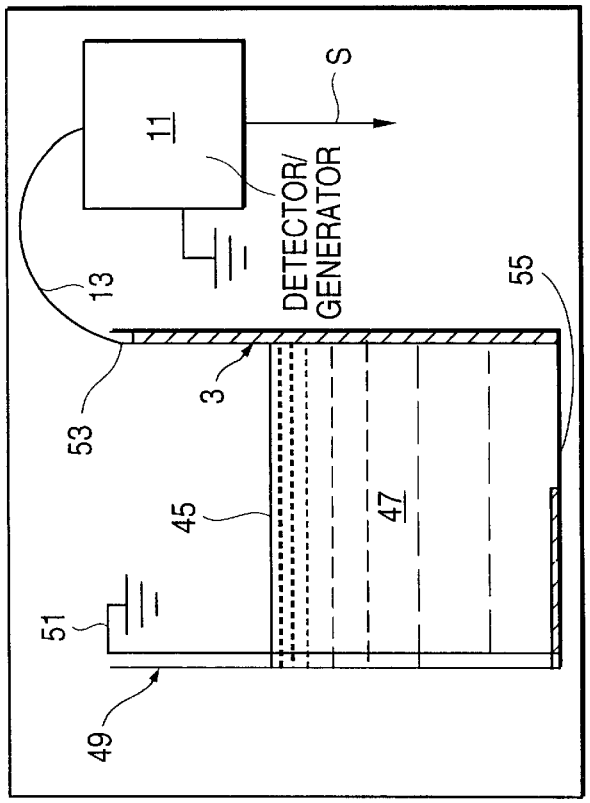
FIG. 6b shows the first method according to the invention for the level measurement of a conductive or highly polar fluid in a tank made of an electrically insulated material.
Figure 6A:
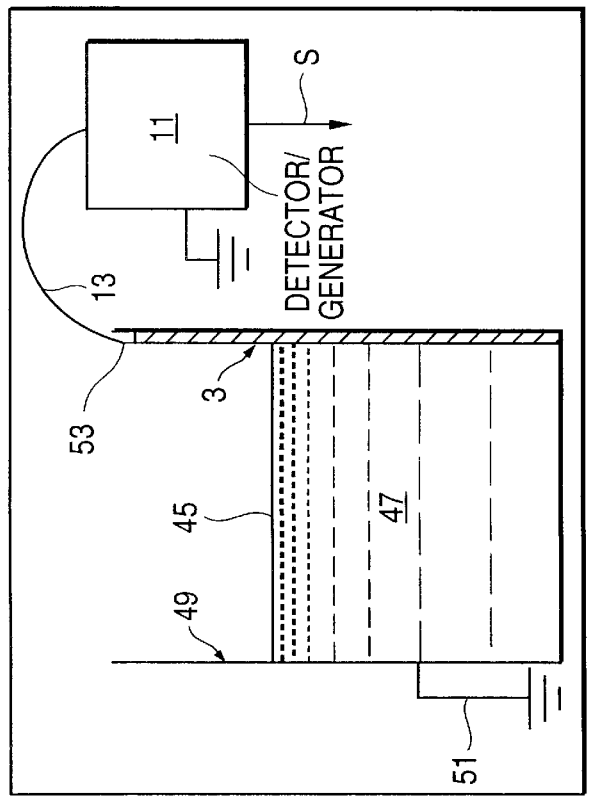
FIG. 6a shows the first method according to the invention for the level measurement of a conductive or highly polar fluid in an electrically conductive tank.

As shown in FIG. 6a, the first method according to the invention (for measurement of a displacement) may be used to measure the level 45 of a fluid 47 which is electrically conductive or highly polar, such as for example water in particular conditions or mercury, in a tank 49 which is also electrically conductive. In that case, the fluid 47 acts as the conductive substance and can be connected to the ground 51 using the expedient of the tank 49 which itself is conductive. The capacitive sensor 3 may be positioned directly on the inner wall 53 of the tank 49 simply by sticking or by appropriate means, and has to be inevitably covered by an insulating and sealing protective layer. To allow measurement of any level 45 of fluid 47 in the tank 49, the sensor 3 only has to be as long as the height of the wall 53 of the tank 49. In the case where the tank 49 is electrically insulated, as shown in FIG. 6b, the electrically conductive or highly polar fluid 47 is connected to the ground 51 by the help of a grounding secondary electrode 55, made of a simple metallic plate for example, disposed at the bottom of the tank 49 inside or outside.

Figure 6C:
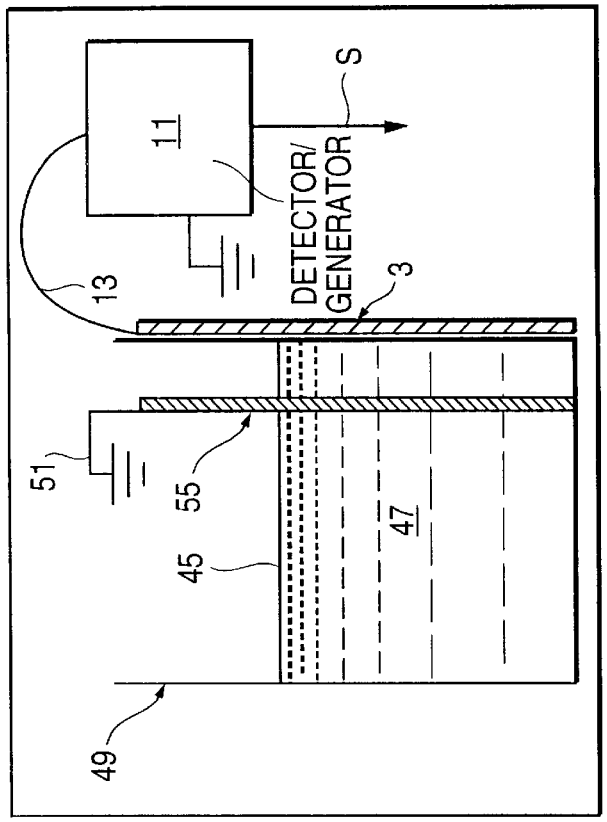
FIG. 6c shows the second method according to the invention for the level measurement of non-conducting fluid in an electrically conductive tank.
Figure 6D:
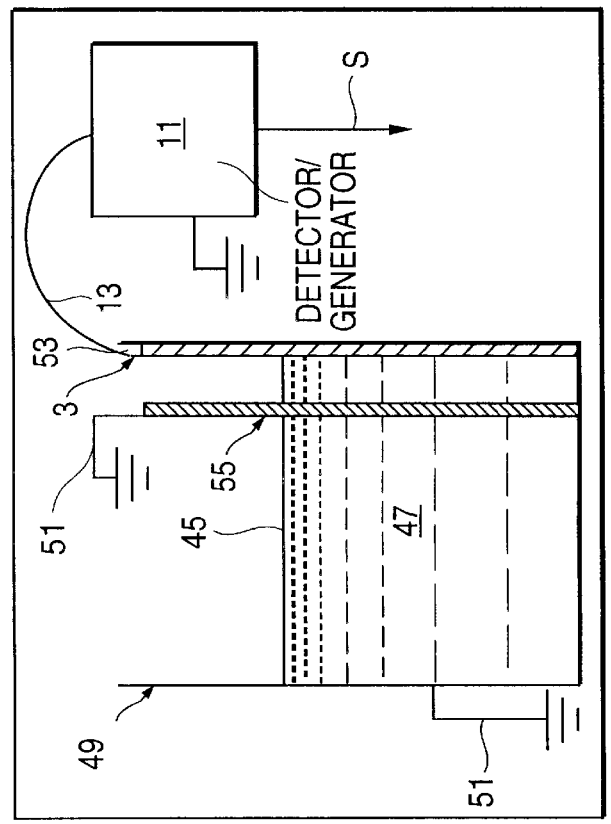
FIG. 6d shows the second method according to the invention for the level measurement of non-conducting fluid in a tank made of an electrically insulated material.

Referring now to FIG. 6c, the apparatus 1 is now used to implement the second method according to the invention (the method for dynamic and non-contact measurement of the permittivity of a dielectric substance) to measure the level 45 of an electrically non-conductive fluid 47 of a relative dielectric constant higher than the one of the air (1 unity) as the one of oil, gasoline or other petroleum derivatives, for example. In this embodiment, the signal S of detected current has an offset which can be adequately corrected or compensated when the tank is empty. This offset is all the more important as the dielectric constant of the solution approaches that of air. A grounding secondary electrode 55 at least as long as the sensor 3, made of a simple metallic plate for example, is connected to the ground 51 and disposed close to the capacitive sensor 3, itself disposed on the inner wall 53 of the electrically conductive tank 49. The protection of the sensor 3 is not necessary but desirable. In the case where the tank 49 is electrically insulated, as shown in FIG. 6d, the sensor 3 can be disposed on the inner or outer wall of the tank 49.

Figure 7:
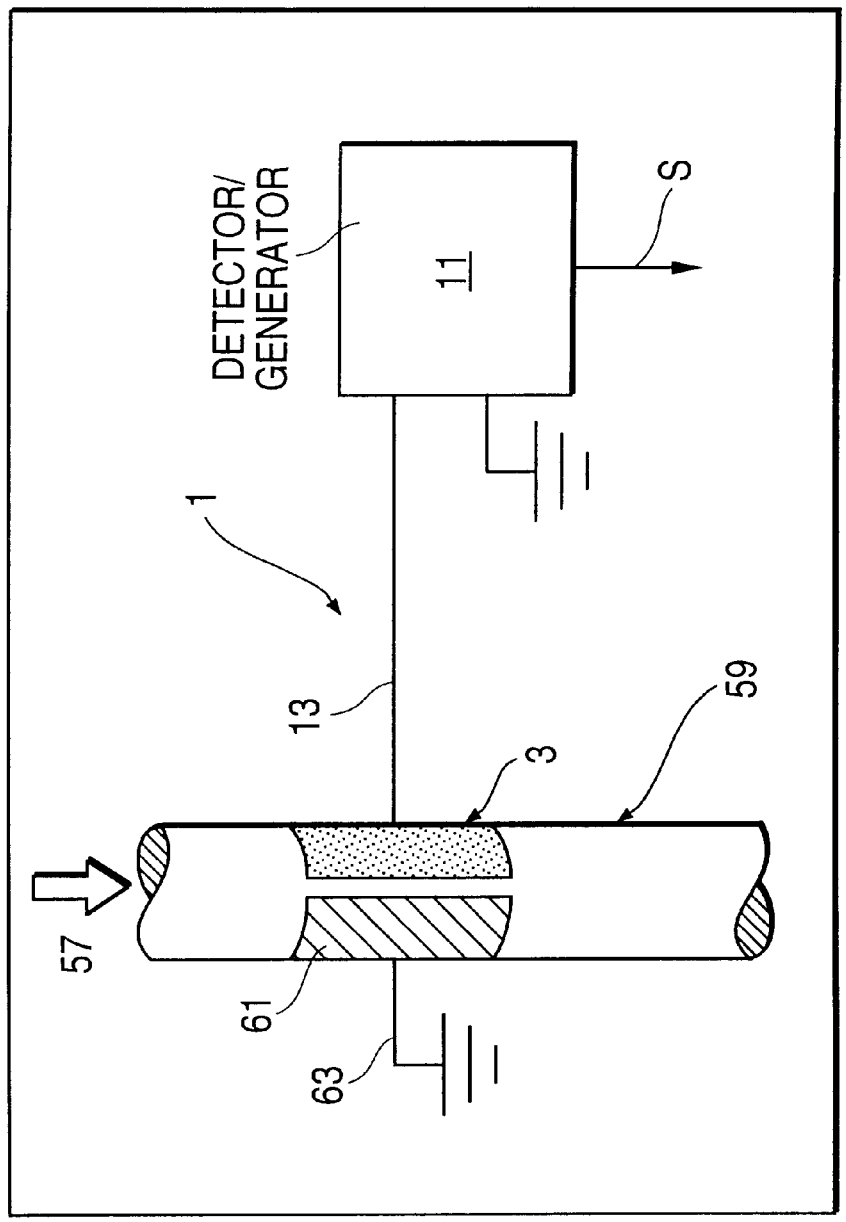
FIG. 7 shows the second method according to the invention for the detection of a water contamination in oil flowing in a conduit.

In FIG. 7, the second method according to the invention is used to detect the composition of a substance 57, possibly altered by a contamination inside an electrically insulated conduit 59. The sensor 3 is positioned directly on the wall of the conduit 59 in a way that the substance 57 inevitably passes between an electrode 61 connected to the ground 63 and this sensor 3, changing the permittivity previously measured when a contamination occurs. Knowing the value of the permittivity of the substance 57 or proceeding to tests for determining it, it would be possible to connect the supply and detection device 11 to an alarm system adjusted beforehand to report any occurring change in the composition of the substance 57 when it is detected.

FIG. 8 shows a diagram of the circuit of the supply and detection device 11 of the apparatus 1 used according to the invention. In this circuit, there is a high frequency signal generator 65. This generator supplies the plate 5 of the sensor 3 which forms a fixed capacitance Cf with the ambient. The plate 7 of the sensor 3 forms, with the surface of the conductive substance 15, a variable capacitance Cv. There is also a parasitic capacitance particular to each type of sensor. This parasitic capacitance is indicated by the symbol Cp. A current detector 67 comprises a low value impedance 69 mounted in series between the generator 65 and the plate 7 of the sensor. The current detector 67 also comprises an insulating circuit connected to the impedance 69 to measure isolately the high frequency voltage signal across this impedance 69 and to extract from the signal so measured a signal proportional to the measured current. The circuit can also comprise an isolation transformer 71 connected, on a side, in parallel to the impedance 69 and, on the other side, to an adjustable gain amplifier 73. This amplifier is at its turn connected to an amplitude demodulator of known type 75 which receives the amplifier signal via a filter 77. The demodulator 75 outputs the requested signal proportional to the detected current and transmits it to appropriate processing means 89 described in further detail hereinafter. For an automatic correction of the apparatus drift, the detector 67 may also incorporate calibration means 79 to replace momentarily the variable capacitance Cv. These calibration means 79, connectable by way of a switch 81, are made of two impedances 83 and 85 of known value allowing to obtain two reference signals (high and low calibrations). These impedances 83 and 85 are switched by a relay 87.

It should be mentioned that the use of such calibration means 79 is optional. In some cases, it allows, before each data acquisition, to take account the amplifier drifts as well as the generator drifts, and further to allow an easy determination of the gain and offsets.

As shown in FIG. 9, the processing means 89 are connected to the current detector 67.

According to a first example of embodiment, these processing means 89 can be built with a processing circuit including a microprocessor 91 whose function is to assure a processing and a recording of the current signals detected by the current detector 67 until they are required. When the information is required, the signals may be then transmitted by the microprocessor 91 to a computer 93 which can be equipped with external recording means 95 (magnetic disks, etc.) and output means 97 (printer, etc.). In the case where several sensors 3 are used, the computer 93 can be connected to a microprocessor 91 associated to each sensor 3 in way to individually process the memorized signal in each of the microprocessors 91 associated with each of the sensors 3. Enlarged lines illustrated in FIG. 9 show, by way of an example, possible connections to other microprocessors 91. The introduction of data which provide the current-displacement or current-permittivity relation for each type of sensor is done once for each type of sensor in the laboratory. As previously indicated, it may be necessary to make a calibration prior to each data acquisition to take account of the drifts of the amplifier and the generator.

According to another example of embodiment, processing means 89 can be built with an alarm circuit 99. This alarm circuit 99 can be installed instead of the processing circuit or jointly with it. The goal to be achieved by this alarm circuit 99 is to generate immediately an alarm signal if the value of the detected current corresponds to a predetermined critical displacement or permittivity. The use of such an alarm circuit 99, which may be connected easily and permanently, is very advantageous mainly in the case of continuous and permanent monitoring of a rotative machine, tank level or contamination of a substance inside a conduit.

What is claimed is:

1. Method for dynamic and non-contact measurement of a displacement of a grounded conductive substance with respect to a capacitive sensor formed of two parallel conductive plates, superimposed, electrically insulated one from the other, and fed by a high frequency signal at a predetermined voltage originating from a signal generator, said capacitive sensor being connected to a device for detecting a current value, said method comprising the steps of:

(a) positioning said capacitive sensor close to and at a perpendicular fixed distance from a plane in which said conductive substance extends, said plates being substantially parallel to said plane, and displacing said conductive substance in said plane to modify an overlapping surface formed by portions of said conductive substance and said capacitive sensor which are superimposed;

(b) detecting a current induced by said high frequency signal in said capacitive sensor, said current having a value varying in a directly proportional relationship with said overlapping surface; and (c) determining the value of the displacement of said conductive substance with respect to said capacitive sensor according to the value of said current, said conductive substance is a fluid contained in a tank, the displacement subjected to said measurement being the one of a level of said fluid in said tank in respect with said capacitive sensor.

2. Method according to claim 1, wherein the detection of said current is carried out by an insulating circuit connected in parallel to a low impedance mounted in series between said signal generator and the nearest plate of the sensor from the conductive substance, said insulating circuit taking measurement of said high frequency signal at terminals of said low impedance, and by extracting from said measurement a signal proportional to said current.

3. Method according to claim 1, wherein determination of the value of said displacement in relation to the value of said current is carried out by means of electronic devices designed or programmed in function of various physical parameters of said capacitive sensor, for determining the real value of said displacement corresponding to the value of said current by taking account of parasitic effects which are specific to said capacitive sensor and may affect the value of said current so measured.

4. Method according to claim 1, wherein several capacitive sensors are positioned at step (a) such that the displacement of said conductive substance modifies said overlapping surface on at least one of said capacitive sensors.

5. Method according to claim 1, wherein:

said conductive substance is the shaft of a rotative machine, the displacement subjected to said measurement being the one of a coupling joint of said shaft in respect with said capacitive sensor.

6. Method for dynamic and non-contact measurement of permittivity of a dielectric substance between a grounded conductive part and a capacitive sensor formed of two parallel conductive plates, superimposed, electrically insulated one from the other, and fed by a high frequency signal at a predetermined voltage originating from a signal generator, said capacitive sensor being connected to a device for detecting a current value, said method comprising the steps of:

(a) positioning said capacitive sensor close to and at a perpendicular fixed distance from a surface of said conductive part so that said dielectric substance whose permittivity is to be measured is between said surface of said conductive part and said capacitive sensor;

(b) detecting a current induced by said high frequency signal in said capacitive sensor, said current varying in a directly proportional relationship with the permittivity of said dielectric substance; and (c) determining the value of the permittivity of said dielectric substance between said conductive part and said capacitive sensor according to the value of said current, said dielectric substance is a fluid contained in a tank, the permittivity subjected to said measurement being modified by a variation of a level of said fluid in tank between said conductive part and said capacitive sensor.

7. Method for dynamic and non-contact measurement of permittivity of a dielectric substance between a grounded conductive part and a capacitive sensor formed of two parallel conductive plates, superimposed, electrically insulated one from the other, and fed by a high frequency signal at a predetermined voltage originating from a signal generator, said capacitive sensor being connected to a device for detecting a current value, said method comprising the steps of:

(a) positioning said capacitive sensor close to and at a perpendicular fixed distance from a surface of said conductive part so that said dielectric substance whose permittivity is to be measured is between said surface of said conductive part and said capacitive sensor;

(b) detecting a current induced by said high frequency signal in said capacitive sensor, said current varying in a directly proportional relationship with the permittivity of said dielectric substance; and (c) determining the value of the permittivity of said dielectric substance between said conductive part and said capacitive sensor according to the value of said current, said dielectric substance is inside a conduit, the value of the permittivity subjected to said measurement being modified by an eventual contamination of said dielectric substance.

* * * * *

UNITED STATES PATENT AND TRADEMARK OFFICE
CERTIFICATE OF CORRECTION

PATENT NO. : 6,075,464
DATED : June 13, 2000
INVENTOR(S) : Marius Cloutier, et al.

Page 1 of 1

It is certified that error appears in the above-identified patent and that said Letters Patent is hereby corrected as shown below:

Please note on the front cover insert

--[30] Foreign Application Priority Data, April 25, 1991 [CA] 2,041,231--.

Signed and Sealed this

Nineteenth Day of June, 2001

*Attest:*

*Attesting Officer*

NICHOLAS P. GODICI
*Acting Director of the United States Patent and Trademark Office*